No. 678,046. Patented July 9, 1901.
C. W. SHELDEN.
ADJUSTABLE CARRIAGE FOR GRAIN HARVESTERS.
(Application filed Jan. 12, 1901.)
(No Model.)
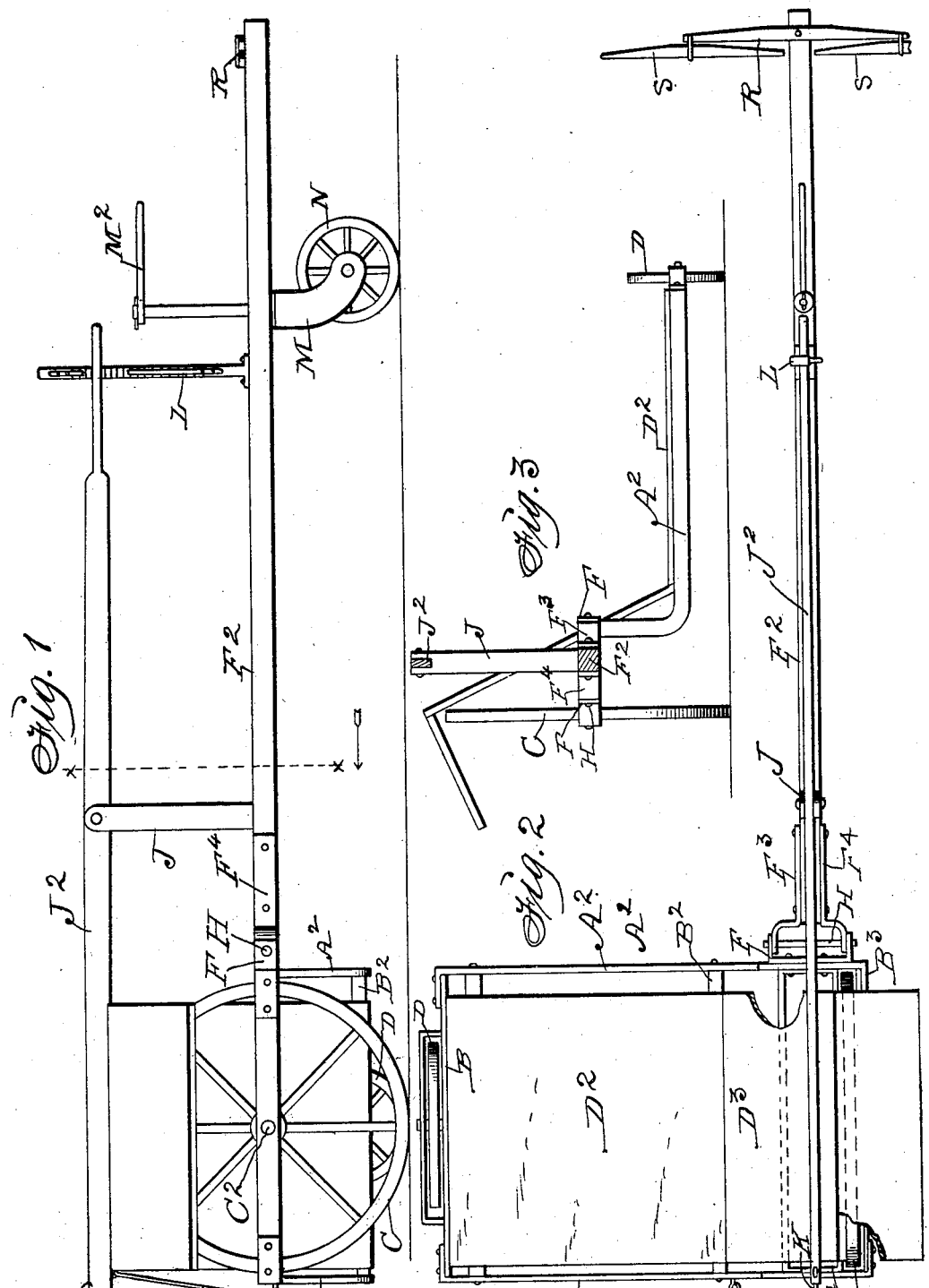

UNITED STATES PATENT OFFICE.

CHARLES W. SHELDEN, OF CLEARFIELD, IOWA.

ADJUSTABLE CARRIAGE FOR GRAIN-HARVESTERS.

SPECIFICATION forming part of Letters Patent No. 678,046, dated July 9, 1901.

Application filed January 12, 1901. Serial No. 42,979. (No model.)

*To all whom it may concern:*

Be it known that I, CHARLES W. SHELDEN, a citizen of the United States, residing at Clearfield, in the county of Taylor and State of Iowa, have invented a new and useful Adjustable Carriage for Grain-Harvesters, of which the following is a specification.

Heretofore harvesters for cutting grain from the ground have had means of adjusting the cutting mechanism relative to the ground, and harvesters for cutting off the heads of grain have had a pole in rear of the machine for hitching horses thereto.

One object of my invention is to provide a carriage for harvesters adapted for hitching horses in the rear of the carriage and mounting operative mechanism on the carriage in such a manner that it will not be necessary to first cut a swath around a field to make place for the travel of horses hitched to a harvester.

A further object is to relieve the horses from the weight of a pole and to allow the carriage to be adjusted relative to the pole and the horses hitched thereto, so as to relieve the horses from weight bearing upon them while traveling on level ground or on up and down grades.

A further object is to provide means for advantageously adjusting the carriage-frame relative to the level surface or inclined grades of the ground and the height at which the grain is to be cut off.

My invention consists in the construction, arrangement, and combination of parts, as hereinafter set forth, pointed out in my claims, and illustrated in the accompanying drawings, in which—

Figure 1 is a side elevation of the carriage and means for adjusting the frame relative to the ground. Fig. 2 is a top view, and Fig. 3 is a transverse sectional view, on the line $x\ x$ of Fig. 1, looking toward the carriage-frame.

The letters A and $A^2$ designate the two parallel side bars of the carriage-frame, having right-angled extensions projected vertically at one end, and B, $B^2$, and $B^3$ are cross-bars fixed to the side bars by means of bolts or in any suitable way.

$B^4$ is an auxiliary frame fixed to the elevated horizontal portions of the elbow-shaped extensions of the parallel side bars.

C is a traction and driver wheel fixed to rotatable axle $C^2$, mounted in bearings formed in or fixed to the cross-bars $B^2$ and $B^3$, and D is a traction-wheel of smaller diameter, mounted on an axle fixed to the cross-bar B, as required to retain the carriage level on even ground.

$D^2$ is a platform fixed on the cross-bars B and $B^2$, and $D^3$ is an inclined extension adapted for supporting a carrier for elevating and delivering grain when cut off to fall upon a carrier when mounted on the platform.

F is a hinge-iron fixed to the horizontal and elevated portion of the elbow-shaped extension of the rear side bar $A^2$. $F^2$ is a pole, and $F^3$ and $F^4$ are mating members of hinge-irons fixed to the sides of the front end of the pole and pivotally connected with the fixed hinge-iron F by means of bolt or bar H, as shown in Fig. 2, or in any suitable way as required to hinge the carriage-frame to the rear end of the pole.

J is a post fixed to the front end portion of the pole $F^2$, and $J^2$ is a lever fulcrumed to the top of the post to extend and vibrate vertically in the plane of the pole. The front end of the lever extends to the front side-bar A of the carriage-frame and is connected therewith by means of a rod K in such a manner that the front end of the carriage-frame can be readily raised and lowered and retained stationary at different points of elevation at different times by means of the lever and the rack connected with the pole hinged to the rear of the carriage-frame.

L is a rack fixed to the rear end portion of the hinged pole to project vertically in such a manner that the free end of the lever $J^2$ can be readily adjustably connected therewith, as required for retaining the carriage-frame at different angles relative to the pole, as is necessary in advancing over up and down grades.

M is a caster-wheel bearer mounted in a bearing formed in or fixed to the rear end portion of the pole.

$M^2$ is an arm fixed to the top of the wheel-bearer, and N is a wheel mounted in bearings at the lower end of the bearer in such a manner that the direction of the machine can be governed as required to steer it while in motion.

R is a doubletree or evener pivotally connected with the rear end of the pole, and S are singletrees connected with the ends of the evener, as required for hitching horses thereto and moving and operating the machine in advance of the horses in such a manner that the path for the horses is clear of grain and only the stubble left on the ground to tread upon.

Having thus described the purpose, construction, and operation of my invention, its practical utility will be understood by persons familiar with the art to which it pertains, and what I claim as new, and desire to secure by Letters Patent, is—

1. A carriage-frame for harvesters composed of two mating parallel side bars, having right-angled extensions projected vertically at one end of each bar and a plurality of cross-bars fixed to the side bars, a traction driver-wheel mounted on the elevated end portion of the frame, a traction-wheel of smaller diameter mounted at the other and lower end of the frame and a hinge-iron fixed to the elevated end portion of the rear side bar for hinging a pole thereto and a hinged pole, arranged and combined to operate in the manner set forth for the purposes stated.

2. An adjustable carriage for harvesters comprising a frame composed of parallel side bars having right-angled extensions projected vertically at one end and a plurality of cross-bars fixed to the side bars, a traction driver-wheel fixed to an axle and the axle rotatably mounted on the elevated end cross-bars and a traction-wheel of smaller diameter mounted at the other end of the frame, a platform fixed on top of the frame, a hinge-iron fixed to the elevated end of the rear side bar, a pole pivotally connected with the fixed hinge-iron, a post fixed on the central portion of the pole, a rack fixed on the rear end portion of the pole, an evener pivoted to the rear end of the pole, a lever fulcrumed to the fixed post on the pole and extended to the front of the carriage-frame to be adjustably connected with the fixed rack and a rod pivotally connected with the front end of the lever and the front side bar of the carriage-frame, arranged and combined to operate in the manner set forth.

CHARLES W. SHELDEN.

Witnesses:
T. S. LONG,
J. W. MOFFETT.